United States Patent
Tanaka

(10) Patent No.: US 9,633,438 B2
(45) Date of Patent: Apr. 25, 2017

(54) THREE-DIMENSIONAL OBJECT RECOGNITION APPARATUS, THREE-DIMENSIONAL OBJECT RECOGNITION METHOD, AND VEHICLE

(71) Applicant: TOYOTA JIDOSHA KABUSHIKI KAISHA, Toyota-shi (JP)

(72) Inventor: Kazuhito Tanaka, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/888,184

(22) PCT Filed: Sep. 9, 2014

(86) PCT No.: PCT/JP2014/004618
§ 371 (c)(1),
(2) Date: Oct. 30, 2015

(87) PCT Pub. No.: WO2015/037222
PCT Pub. Date: Mar. 19, 2015

(65) Prior Publication Data
US 2016/0063710 A1 Mar. 3, 2016

(30) Foreign Application Priority Data

Sep. 11, 2013 (JP) ................. 2013-188267

(51) Int. Cl.
*G06K 9/00* (2006.01)
*G06T 7/00* (2017.01)
*G05D 1/02* (2006.01)

(52) U.S. Cl.
CPC ......... *G06T 7/0042* (2013.01); *G05D 1/0246* (2013.01); *G06K 9/00201* (2013.01);
(Continued)

(58) Field of Classification Search
CPC ... G06T 7/0042; G06T 7/0043; G06T 7/0044; G06T 7/0045; G06T 7/0046; G06T 7/0047; G06T 7/0048
USPC ........................................ 382/154
See application file for complete search history.

(56) References Cited

U.S. PATENT DOCUMENTS

| | | | | |
|---|---|---|---|---|
| 6,539,294 | B1* | 3/2003 | Kageyama | E02F 3/842 180/168 |
| 2005/0228614 | A1* | 10/2005 | Usbeck | G06K 9/4633 702/179 |
| 2006/0177101 | A1* | 8/2006 | Kato | G01C 11/02 382/106 |
| 2009/0154769 | A1* | 6/2009 | Yoon | G06K 9/32 382/103 |

(Continued)

FOREIGN PATENT DOCUMENTS

| | | |
|---|---|---|
| JP | 2009 237898 | 10/2009 |
| JP | 2011 106820 | 6/2011 |

OTHER PUBLICATIONS

International Search Report Issued Dec. 9, 2014 in PCT/JP14/004618 Filed Sep. 9, 2014.

*Primary Examiner* — John Strege
(74) *Attorney, Agent, or Firm* — Oblon, McClelland, Maier & Neustadt, L.L.P.

(57) ABSTRACT

A three-dimensional object recognition apparatus according to the invention includes: an omnidirectional sensor that measures surrounding objects in all directions, and generates positional information capable of specifying positions of the objects as a result of the measurement; a three-dimensional measurement device that measures an object within a certain measurement range among the surrounding objects, and generates three-dimensional shape information capable of specifying a three-dimensional shape of the object as a result of the measurement; and a control unit that updates a shape (Continued)

to be recognized as the three-dimensional shape of the object based on the three-dimensional shape information generated by the three-dimensional measurement device when the object is within the measurement range of the three-dimensional measurement device. The control unit tracks the object based on the positional information generated by the omnidirectional sensor, even after the object has moved out of the measurement range of the three-dimensional measurement device.

11 Claims, 11 Drawing Sheets

(52) U.S. Cl.
CPC ...... *G06K 9/00805* (2013.01); *G06T 2200/04* (2013.01); *G06T 2207/30248* (2013.01); *G06T 2207/30261* (2013.01)

(56) References Cited

U.S. PATENT DOCUMENTS

| | | | |
|---|---|---|---|
| 2011/0234758 A1* | 9/2011 | Tsuboi | H04N 13/0253 348/46 |
| 2012/0045100 A1* | 2/2012 | Ishigami | G06T 7/0065 382/106 |
| 2012/0212588 A1* | 8/2012 | Ohtomo | G01C 15/002 348/50 |
| 2012/0294534 A1* | 11/2012 | Watanabe | G06K 9/00214 382/195 |
| 2012/0328152 A1* | 12/2012 | Bamba | G06T 3/0062 382/103 |
| 2014/0098996 A1* | 4/2014 | Fujimatsu | G06T 7/2053 382/103 |
| 2016/0188965 A1* | 6/2016 | McClure | G06K 9/00335 382/103 |

* cited by examiner

THREE-DIMENSIONAL OBJECT RECOGNITION APPARATUS, THREE-DIMENSIONAL OBJECT RECOGNITION METHOD, AND VEHICLE

TECHNICAL FIELD

The present invention relates to a three-dimensional object recognition apparatus, a three-dimensional object recognition method, and a vehicle.

BACKGROUND ART

Patent Literature 1 discloses a vehicle including an image recognition device mounted thereon so as to accurately and rapidly recognize, in an image taken by a camera, pedestrians within a certain range in front of the vehicle. This image recognition device imparts an identification information ID to a target to be detected in or beyond a predetermined pedestrian detectable region in front of the vehicle by a search by a laser radar. Accordingly, identification information IDs are imparted to targets other than pedestrians, for example, vehicles or road-side objects such as poles, which absorb less laser light. Further, this image recognition device performs image recognition processing of pattern matching only on targets with no identification information ID in the pedestrian detectable region of the camera, thereby recognizing pedestrians. According to this technique, the load of the image recognition processing can be reduced and pedestrians within the pedestrian detectable region can be recognized accurately and rapidly.

CITATION LIST

Patent Literature

Patent Literature 1: Japanese Unexamined Patent Application Publication No. 2009-237898

SUMMARY OF INVENTION

Technical Problem

The applicant of the present application has found the following problems in the technique in which surrounding objects are recognized as described above. The problems will be described below. Note that the following description is not about the related art, but is instead about the matters newly reviewed by the applicant of the present application. A vehicle that autonomously travels while recognizing surrounding obstacles (objects) using a sensor will now be considered.

First, as a technique for a vehicle to autonomously travel while avoiding obstacles, a simple technique can be employed in which a travel path to avoid obstacles is planned in consideration of only the presence or absence of obstacles and the position of each obstacle, without considering the three-dimensional shape of surrounding obstacles. In this technique, although the position of each obstacle can be tracked and recognized, there is a possibility that the vehicle will contact an overhanging obstacle or the like. This is because obstacles generally have three-dimensional features which differ depending on the type of obstacle. For example, some obstacles have particular projecting portions, such as the legs of a chair.

Thus, in order for the vehicle to autonomously travel without contacting any obstacle, it is necessary for the vehicle to travel while recognizing the three-dimensional shape of each obstacle and planning a travel path in consideration of the three-dimensional shape of each obstacle so that the vehicle can avoid contacting obstacles.

As a technique that satisfies such a requirement, a technique can be employed in which the three-dimensional shape of each obstacle is measured using a sensor which is mounted in the vehicle and measures the three-dimensional shape of surrounding obstacles. However, the measurement range of many of the sensors that measure the three-dimensional shape is limited. Accordingly, obstacles located in the dead zone of the sensor cannot be measured.

Assuming a case where the position of an obstacle which has entered the dead zone of the sensor is stored as a countermeasure against this problem, a travel path can be planned based on the position, but it cannot be determined if the obstacle has traveled or not after the travel path is planned. Therefore, if a travel path is planned near the location where the obstacle is in the dead zone of the sensor, there is a possibility that the vehicle will contact the obstacle moving from the location. On the other hand, if a travel path is planned so as to make a large detour around the location, the planned travel path may make a large detour around the obstacle which has actually stopped traveling. This may cause a deterioration in travel efficiency.

As another countermeasure against the problem, it is also possible to mount a sensor capable of measuring three-dimensional shapes of surrounding obstacles in all directions with no limitation in the measurement range thereof. However, a tradeoff has to be made between the accuracy and measurement range of the sensor and the cost and mountability of the sensor. Specifically, in order to measure three-dimensional shapes of surrounding obstacles in all directions, it is necessary to mount an expensive sensor having the function of measuring three-dimensional shapes of surrounding objects in all directions, or to mount a number of sensors that measure three-dimensional shapes of obstacles within a certain measurement range so that the three-dimensional shapes can be measured in all directions. This causes a problem that the cost becomes extremely high.

The present invention has been made based on the above-mentioned findings, and an object of the present invention is to provide a three-dimensional object recognition apparatus, a three-dimensional object recognition method, and a vehicle which are capable of recognizing three-dimensional shapes of surrounding objects within a wide range, while preventing an increase in cost.

Solution to Problem

A first aspect of the present invention is a three-dimensional object recognition apparatus including: an omnidirectional sensor that measures surrounding objects in all directions, and generates positional information capable of specifying a position of each of the objects as a result of the measurement; a three-dimensional measurement device that measures an object within a certain measurement range among the surrounding objects, and generates three-dimensional shape information capable of specifying a three-dimensional shape of the object as a result of the measurement; and a control unit that updates a shape to be recognized as the three-dimensional shape of the object based on the three-dimensional shape information generated by the three-dimensional measurement device when the object is within the measurement range of the three-dimensional measurement device. The control unit tracks the object based on the positional information generated by the omnidirectional sensor, even after the object has moved out of the measurement range of the three-dimensional measurement device.

A second aspect of the present invention is a three-dimensional object recognition method including the steps of: measuring, by a three-dimensional measurement device, a three-dimensional shape of an object within a certain measurement range of the three-dimensional measurement device among surrounding objects, and updating a shape to be recognized as the three-dimensional shape of the object within the measurement range of the three-dimensional measurement device based on a result of the measurement; and measuring, by an omnidirectional sensor, positions of the surrounding objects in all directions, and tracking, based on a result of the measurement, an object that has moved out of the measurement range of the three-dimensional measurement device.

A third aspect of the present invention is a vehicle including: an omnidirectional sensor that measures surrounding objects in all directions, and generates positional information capable of specifying a position of each of the objects as a result of the measurement; a three-dimensional measurement device that measures an object within a certain measurement range among the surrounding objects, and generates three-dimensional shape information capable of specifying a three-dimensional shape of the object as a result of the measurement; and a control unit that updates a shape to be recognized as the three-dimensional shape of the object based on the three-dimensional shape information generated by the three-dimensional measurement device when the object is within the measurement range of the three-dimensional measurement device, plans a travel path to avoid contact with the obstacle, based on the recognized three-dimensional shape of the object, and controls the vehicle to travel along the planned travel path. The control unit tracks the object based on the positional information generated by the omnidirectional sensor, even after the object has moved out of the measurement range of the three-dimensional measurement device.

Advantageous Effects of Invention

According to the above aspects of the present invention, it is possible to provide a three-dimensional object recognition apparatus, a three-dimensional object recognition method, and a vehicle which are capable of recognizing three-dimensional shapes of surrounding objects within a wide range, while preventing an increase in cost.

DESCRIPTION OF EMBODIMENTS

Preferred embodiments of the present invention will be described below with reference to the drawings. Specific numbers and the like shown in the following embodiments are illustrated to facilitate understanding of the invention, and thus the present invention is not limited to the numbers and the like, unless otherwise specified. In the following description and the drawings, descriptions of the matters obvious to those skilled in the art, for example, are abbreviated and simplified as appropriate for clarity of explanation.

EMBODIMENTS OF THE INVENTION

Figure 1:
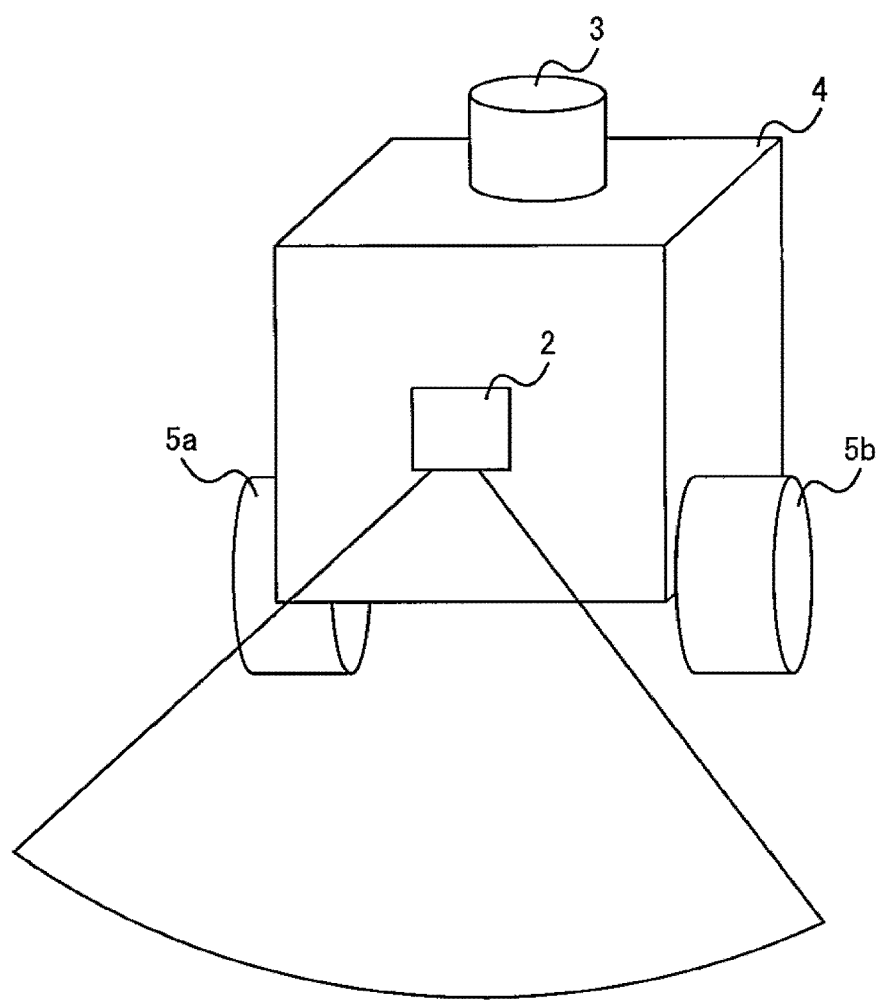
FIG. 1 is a view showing an external structure of an autonomous vehicle according to an embodiment.
Figure 2:
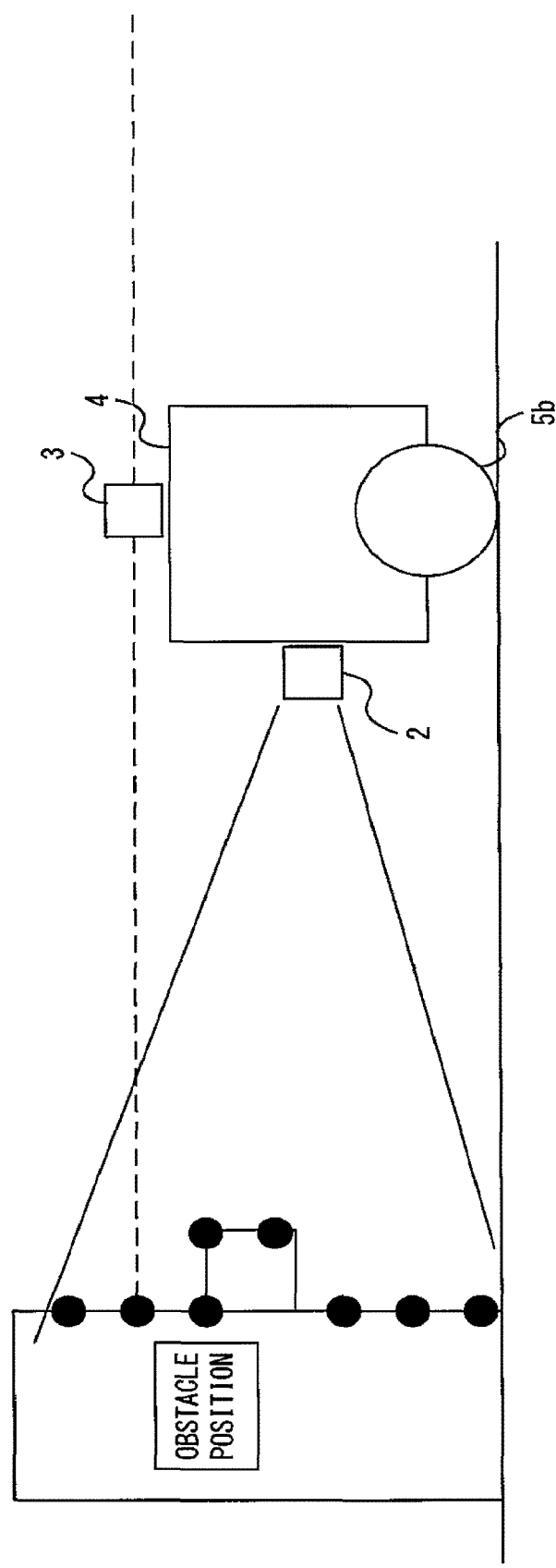
FIG. 2 is a diagram showing an example of a state in which an object is measured by the autonomous vehicle according to the embodiment.

First, an autonomous vehicle 1 according to an embodiment of the invention will be described. Referring to FIGS. 1 and 2, the external structure of the autonomous vehicle 1 according to this embodiment will be described. FIG. 1 is a view showing the external structure of the autonomous vehicle 1 according to this embodiment. FIG. 2 is a diagram showing an example of a state in which an obstacle is measured by the autonomous vehicle 1 according to this embodiment.

The autonomous vehicle 1 includes a three-dimensional distance sensor 2, an omnidirectional sensor 3, a main body 4, and wheels 5a and 5b. The autonomous vehicle 1 autonomously travels while recognizing obstacles (objects) in the vicinity of the autonomous vehicle 1 and avoiding the obstacles.

As shown in FIG. 2, the three-dimensional distance sensor 2 measures obstacles within a certain measurement range among the obstacles in the vicinity of the autonomous vehicle 1, and generates three-dimensional shape information capable of specifying a three-dimensional shape on a measuring surface (a surface facing the three-dimensional distance sensor 2) of each of the obstacles as a result of the measurement. The three-dimensional distance sensor 2 is disposed at a front portion of the main body 4 so as to measure obstacles in front of the autonomous vehicle 1.

More specifically, the three-dimensional distance sensor 2 is, for example, a sensor that measures a distance from obstacles in each direction within the measurement range of the sensor. In other words, the three-dimensional distance sensor 2 is a sensor that generates, as three-dimensional shape information, distance information indicating a distance from each point on the measuring surface of obstacles within the measurement range of the sensor. Any type of sensors, such as an optical sensor, an ultrasonic sensor, and a laser beam sensor, can be used as the three-dimensional distance sensor.

Thus, the three-dimensional distance sensor 2 can measure the three-dimensional shapes of only obstacles within a certain measurement range, but the three-dimensional distance sensor 2 is inexpensive compared to sensors which can measure the three-dimensional shapes of obstacles in all directions.

In this case, the device (three-dimensional measurement device) that measures an obstacle and generates three-dimensional shape information capable of specifying the three-dimensional shape of the obstacle is not limited to the three-dimensional distance sensor 2. For example, as the three-dimensional measurement device, a camera (image pickup device) may be provided instead of the three-dimensional distance sensor 2. Further, images of obstacles within a certain range may be taken by the camera, and image information indicating the images taken within the range may be generated as three-dimensional shape information. That is, any form of the three-dimensional shape information and any device for generating the three-dimensional shape information can be adopted as long as information capable of specifying the three-dimensional shape of each obstacle within the measurement range from the content of the information can be obtained. In other words, the three-dimensional shape information may be information, such as distance information, which indicates the three-dimensional shape of an obstacle as a distance, or may be information, such as image information, which is capable of deriving the three-dimensional shape of an obstacle by analyzing the content of the information.

As shown in FIG. 2, the omnidirectional sensor 3 is a sensor that measures obstacles in the periphery of the autonomous vehicle 1 in all directions, and generates obstacle position information capable of specifying the positions of the obstacles as a result of the measurement. The omnidirectional sensor 3 is disposed at an upper portion of the main body 4 so as to measure obstacles in the vicinity of the autonomous vehicle 1 in all directions.

The omnidirectional sensor 3 may be, for example, a sensor that measures a distance from each obstacle in the vicinity of the autonomous vehicle 1 in all directions, and generates, as obstacle position information, distance information indicating a distance from each obstacle in all directions. In this case, an inexpensive distance sensor which can measure a distance from each obstacle in all directions but cannot measure the three-dimensional shape of each obstacle is used as the omnidirectional sensor 3. The omnidirectional sensor 3 may be a sensor that picks up images of obstacles in the vicinity of the autonomous vehicle 1 in all directions, and generates, as obstacle position information, image information indicating the images picked up in all directions. That is, any form of the obstacle position information and any omnidirectional sensor can be adopted as long as information capable of specifying the positions of obstacles in all directions from the content of the information can be obtained. In other words, the obstacle position information may be information, such as distance information, which indicates a distance from an obstacle, or may be information, such as image information, which is capable of deriving a distance from an obstacle by analyzing the content of the information.

Thus, the omnidirectional sensor 3 is an inexpensive sensor which cannot measure the three-dimensional shape of surrounding obstacles, but can measure the positions of obstacles within a wide range. Although the omnidirectional sensor 3 cannot measure the three-dimensional shape of each obstacle, the measurement range of the omnidirectional sensor 3 in the horizontal direction is wider than that of the three-dimensional distance sensor 2.

The wheels 5a and 5b are provided at a lower portion of the main body 4. The autonomous vehicle 1 travels by driving the wheels 5a and 5b.

The structure described above allows the autonomous vehicle 1 to autonomously travel while avoiding obstacles in the vicinity of the autonomous vehicle 1 by using the measurement results of the three-dimensional distance sensor 2 and the omnidirectional sensor 3. The autonomous vehicle 1 according to this embodiment uses a combination of the three-dimensional distance sensor 2 and the omnidirectional sensor 3, which makes it possible to recognize the three-dimensional shape of surrounding obstacles within a wide range even if the measurement range of the three-dimensional distance sensor 2 that measures the three-dimensional shape is limited.

Figure 3:
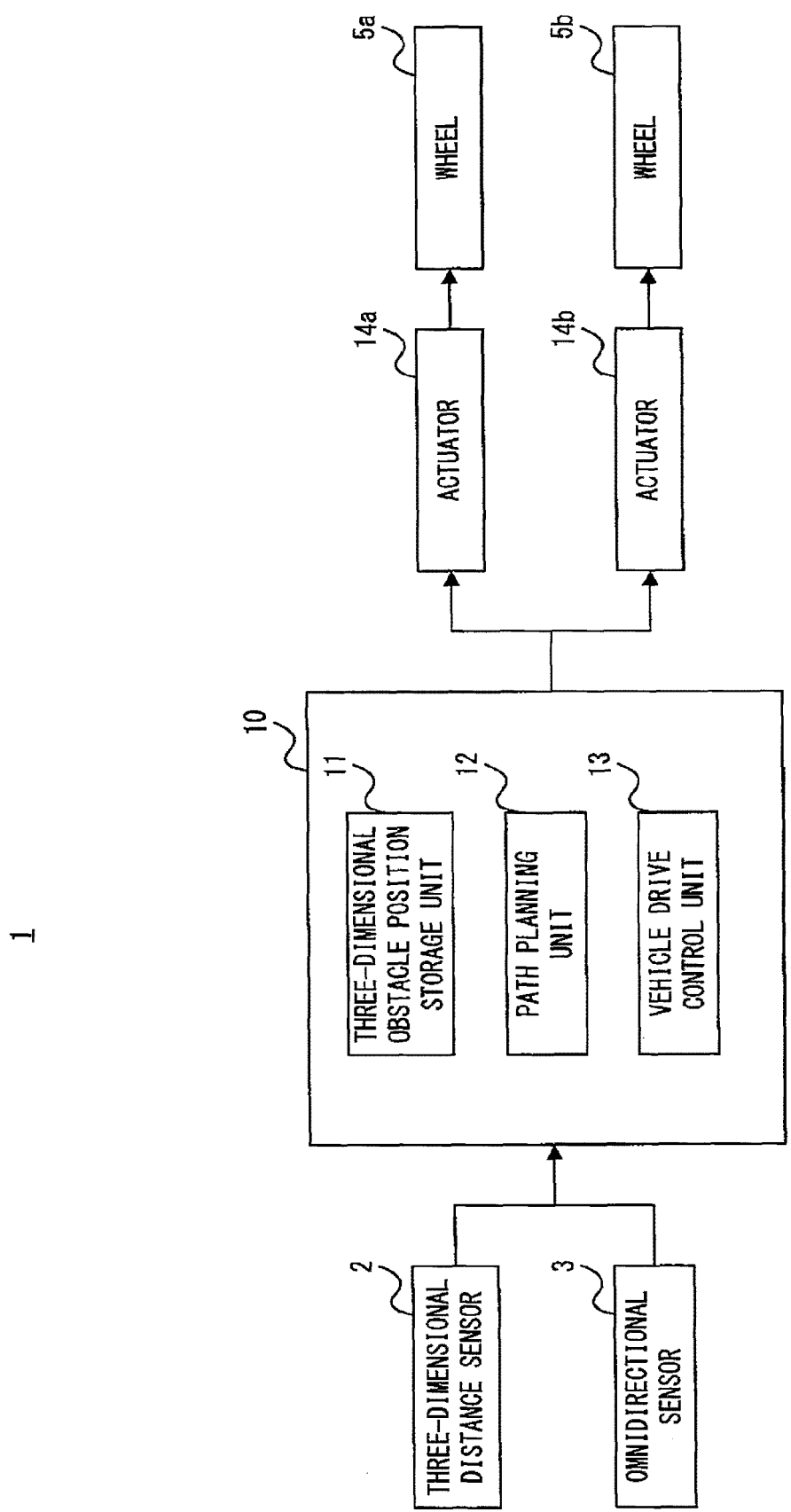
FIG. 3 is an internal block diagram showing the autonomous vehicle according to the embodiment.

Referring next to FIG. 3, the internal structure of the autonomous vehicle 1 according to this embodiment will be described. FIG. 3 is an internal block diagram showing the autonomous vehicle 1 according to this embodiment.

The autonomous vehicle 1 includes a control unit 10 and actuators 14a and 14b.

The control unit 10 controls the autonomous vehicle 1 in an integrated manner. The control unit 10 includes a CPU (Central Processing Unit) and a storage unit (not shown). The CPU executes a program stored in the storage unit, thereby implementing various processes as the control unit 10. In other words, this program includes code for causing the CPU included in the control unit 10 to execute various processes as the control unit 10. In this case, the storage unit stores the above-mentioned program and various pieces of information used by the control unit 10. The storage unit includes at least one storage device capable of storing the above-mentioned program and various pieces of information. For example, at least one of a memory, a hard disk, and the like may be arbitrarily used as the storage device. The control unit 10 functions as a three-dimensional obstacle position storage unit 11, a path planning unit 12, and a vehicle drive control unit 13.

The three-dimensional obstacle position storage unit 11 recognizes obstacles in the vicinity of the autonomous vehicle 1 and the positions of the obstacles based on the obstacle position information output from the omnidirectional sensor 3, and imparts identification information to each of the recognized obstacles. The term "identification information" used herein refers to information capable of uniquely specifying each obstacle. For example, a unique integer may be assigned as the identification information. Further, the three-dimensional obstacle position storage unit 11 tracks the current position of each of the recognized obstacles based on the positions of the obstacles specified based on the obstacle position information. This makes it possible to track the current position of each of the obstacles, regardless of whether or not the obstacles are within the measurement range of the three-dimensional distance sensor 2.

When the position of an obstacle specified based on the obstacle position information output from the omnidirectional sensor 3 is within the measurement range of the three-dimensional distance sensor 2, the three-dimensional obstacle position storage unit 1 stores, in the storage unit, the obstacle position information indicating the position of the obstacle and the three-dimensional shape information indicating the three-dimensional shape of the obstacle specified based on the three-dimensional shape information output from the three-dimensional distance sensor 2, in such a manner that the obstacle position information and the three-dimensional shape information are linked to each other. That is, the obstacle position information and the three-dimensional shape information are stored in the storage unit in such a manner that the obstacle position information and the three-dimensional shape information for each obstacle are linked to each other. In this case, the form of the obstacle position information output from the omnidirectional sensor 3 and the form of the obstacle position information stored in the storage unit may be the same as or different from each other. The form of the three-dimensional shape information output from the three-dimensional distance sensor 2 and the form of the information stored in the storage unit may be the same as or different from each other. Specifically, in the case of slicing information for each obstacle from the three-dimensional shape information and the obstacle position information, which are output from the three-dimensional distance sensor 2 and the omnidirectional sensor 3, respectively, the cut-out information may be directly stored, or may be stored after the form of the information is converted as in the case where the position and three-dimensional shape of each obstacle is specified from image information.

After that, while the position of the obstacle is within the measurement range of the three-dimensional distance sensor 2, the three-dimensional obstacle position storage unit 11 updates the three-dimensional shape information about the obstacle by replacing the three-dimensional information with information indicating a latest three-dimensional shape specified based on the three-dimensional shape information output from the three-dimensional distance sensor 2.

The three-dimensional obstacle position storage unit 11 also stores, in the storage unit, three-dimensional shape accumulated information indicating all accumulated three-dimensional shapes, which have been recognized so far for each obstacle, aside from the three-dimensional shape information indicating the latest three-dimensional shape. The three-dimensional obstacle position storage unit 11 accumulates the three-dimensional shapes of obstacles based on the positions of the obstacles. Accordingly, when the obstacle is a moving object, such as a human, and the shape of the obstacle is changing, the movable range of the obstacle can be sequentially supplemented as the three-dimensional shape of the obstacle.

Further, when the obstacle has moved out of the measurement range of the three-dimensional distance sensor 2, the three-dimensional obstacle position storage unit 11 calculates, according to a predetermined calculation method, the three-dimensional shape of the obstacle that is estimated as a range within which the obstacle can move, based on the accumulated three-dimensional shapes indicated by the three-dimensional shape accumulated information about the obstacle that is stored in the storage unit. The calculation method will be described later. Further, the three-dimensional obstacle position storage unit 11 stores the three-dimensional shape information indicating the calculated three-dimensional shape as the three-dimensional shape information indicating the latest three-dimensional shape of the obstacle. In this manner, when the obstacle has moved out of the measurement range of the three-dimensional distance sensor 2, an enlarged three-dimensional shape which is estimated as the movable range of the obstacle is recognized as the three-dimensional shape of the obstacle, so that the autonomous vehicle 1 can avoid contacting the obstacle.

Furthermore, when the obstacle enters the measurement range of the three-dimensional distance sensor 2 again, the three-dimensional obstacle position storage unit 11 resumes updating the three-dimensional shape information indicating the latest three-dimensional shape of the obstacle based on the three-dimensional shape information output from the three-dimensional distance sensor 2.

Thus, even after the obstacle has moved out of the measurement range of the three-dimensional distance sensor 2, the obstacle can be tracked based on the measurement result of the omnidirectional sensor 3 and the three-dimensional shape of the obstacle can be continuously recognized.

Based on the obstacle position information and the three-dimensional shape information which are stored in the storage unit, the path planning unit 12 plans a path along which the autonomous vehicle 1 travels so that the autonomous vehicle 1 can avoid contacting obstacles. The vehicle drive control unit 13 calculates drive command values for the actuator 14a and 14b so that the autonomous vehicle 1 travels along the path planned by the path planning unit 12. The vehicle drive control unit 13 outputs the calculated drive command values to the actuators 14a and 14b.

The actuators 14a and 14b respectively drive the wheels 5a and 5b of the autonomous vehicle 1. The actuator 14a rotates the wheel 5a at a rotational speed according to the drive command value from the vehicle drive control unit 13. The actuator 14b rotates the wheel 5b at a rotational speed according to the drive command value from the vehicle drive control unit 13.

The wheels 5a and 5b correspond to wheels mounted on a lower portion of the main body 4 described above. In this manner, the vehicle drive control unit 13 controls the actuators 14a and 14b to rotate the wheels 5a and 5b, respectively, thereby allowing the autonomous vehicle 1 to travel along the travel path planned so that the autonomous vehicle 1 can avoid contacting any obstacle.

Figure 4:
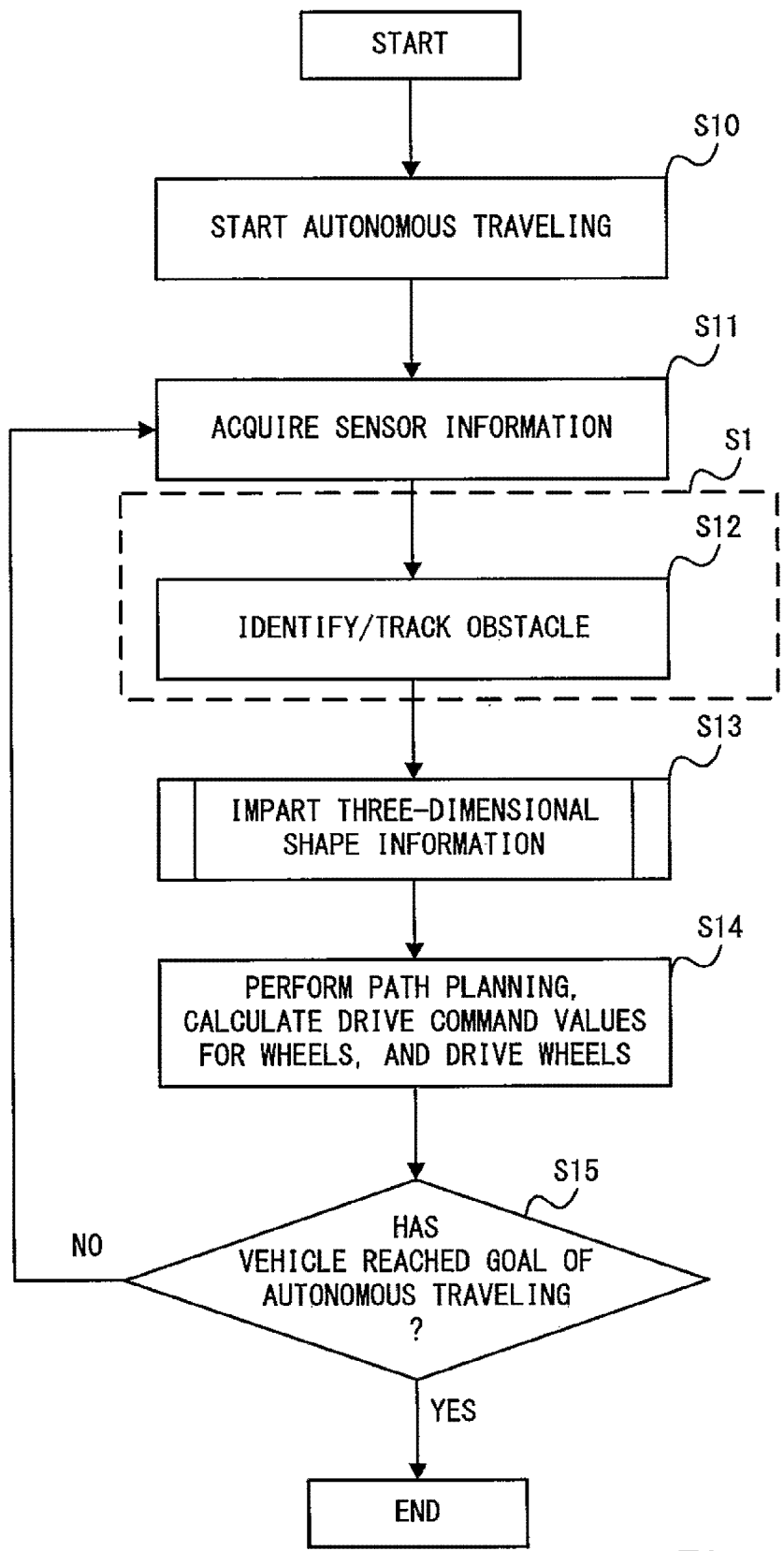
FIG. 4 is a flowchart showing a process of the autonomous vehicle according to the embodiment.
Figure 5:
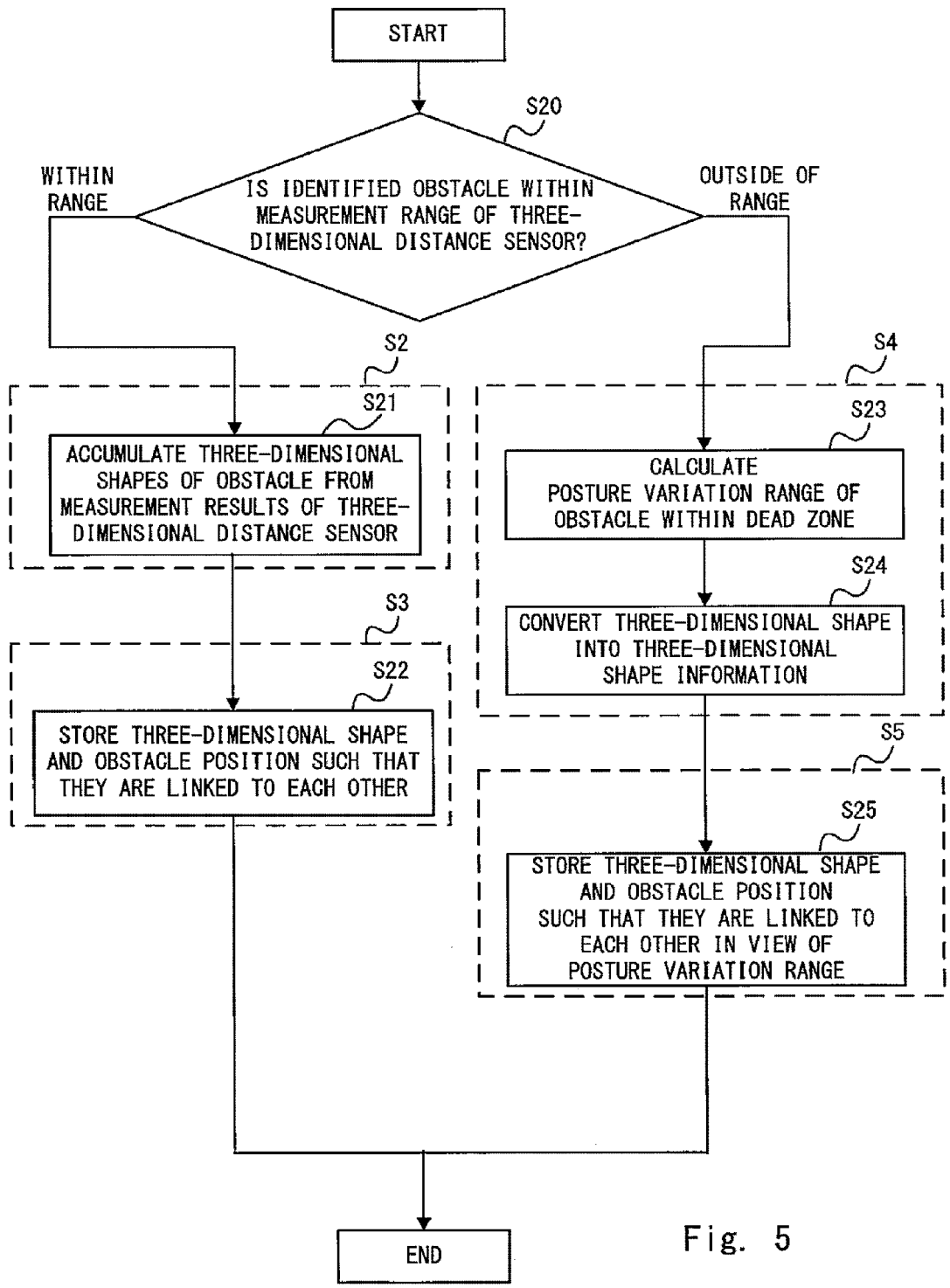
FIG. 5 is a flowchart showing a three-dimensional shape information imparting process in step S13 shown in FIG. 4.
Figure 6:
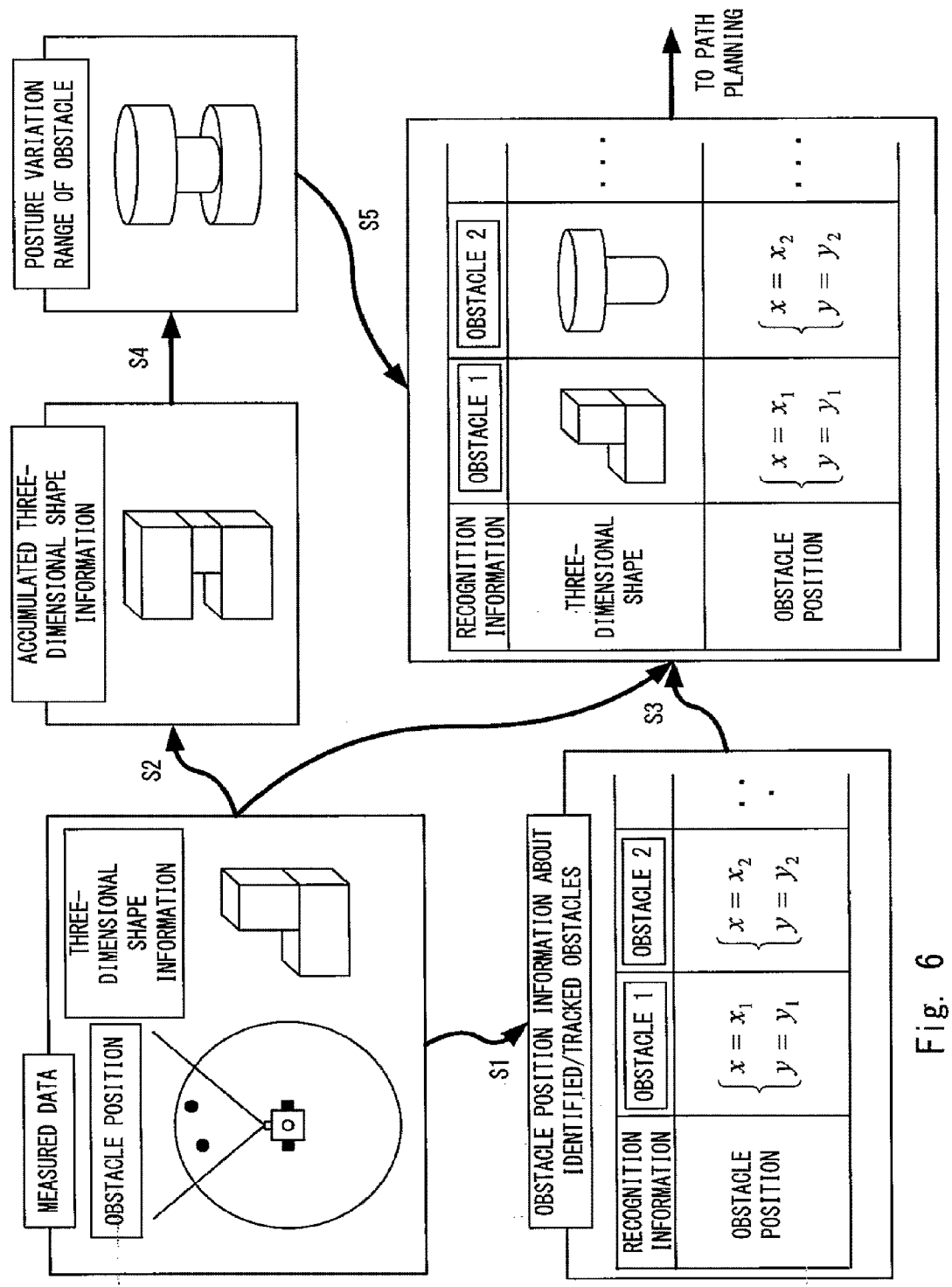
FIG. 6 is a diagram showing a flow of data treated by the autonomous vehicle according to the embodiment.
Figure 7:
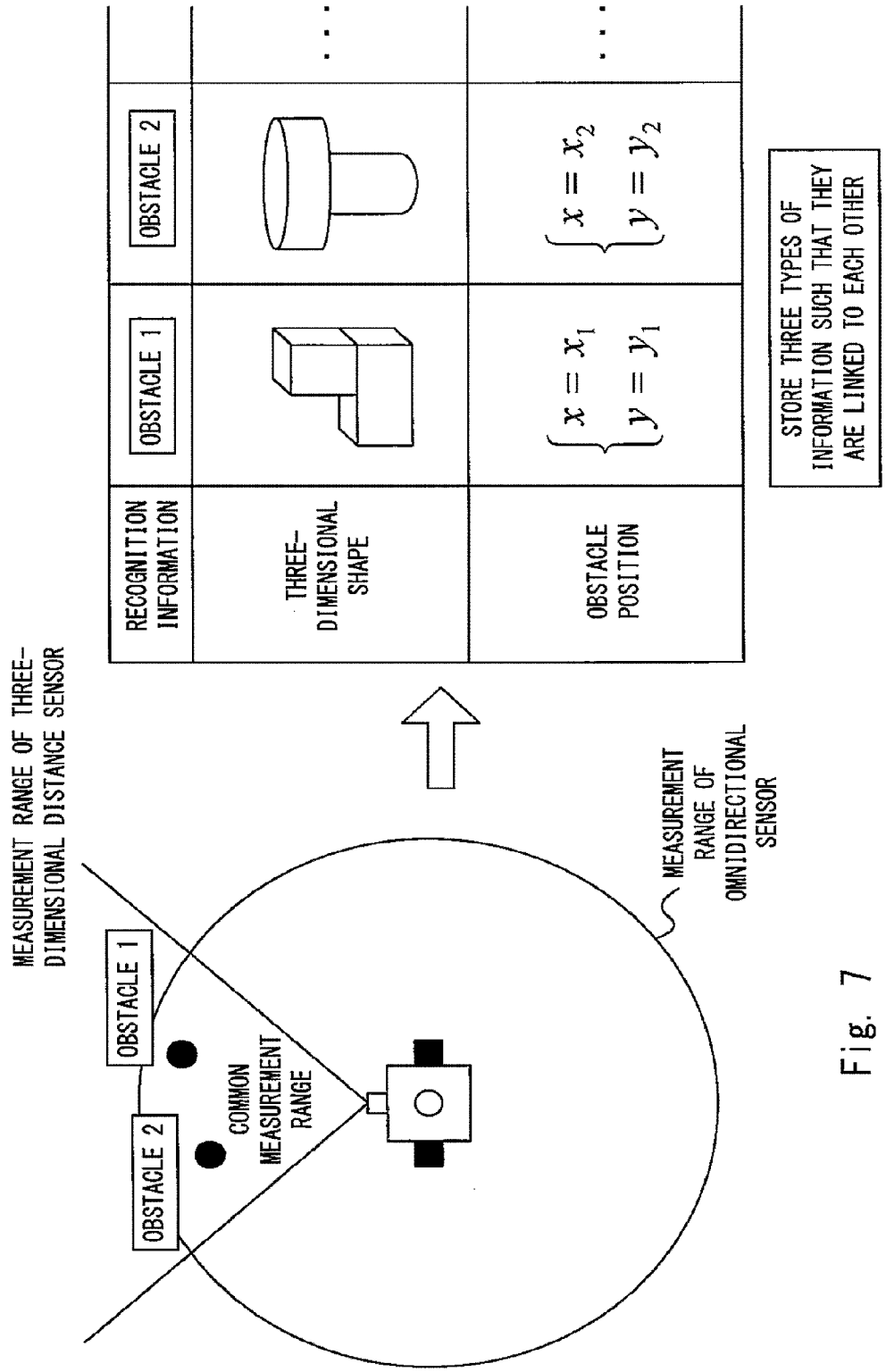
FIG. 7 is a diagram showing an example in which obstacle positions and three-dimensional shapes are linked to each other.
Figure 8:
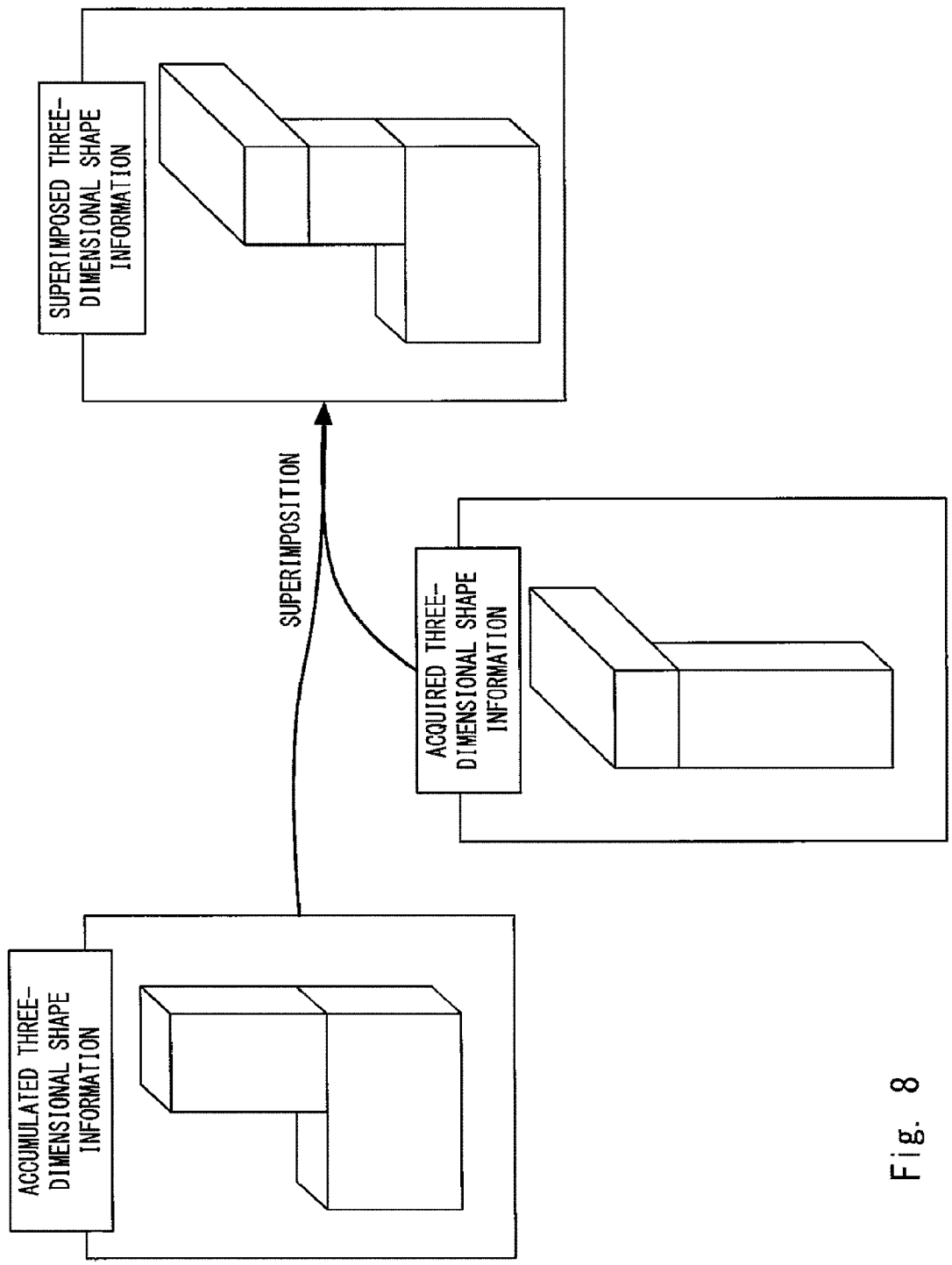
FIG. 8 is a diagram showing an example in which three-dimensional shapes of obstacles in a measurement range of a three-dimensional distance sensor are accumulated.
Figure 9:
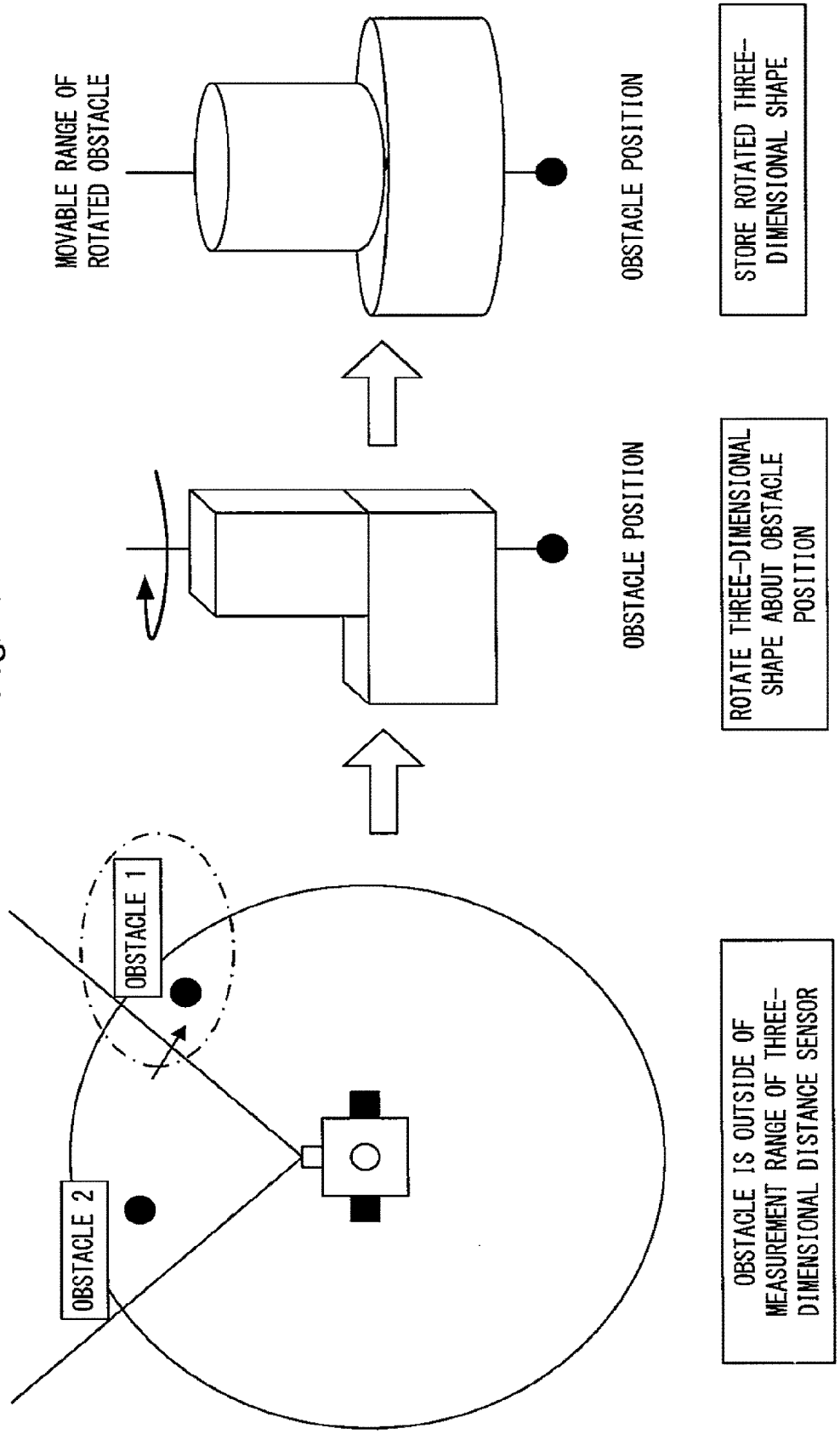
FIG. 9 is a diagram showing an example in which a three-dimensional shape of an obstacle outside of the measurement range of the three-dimensional distance sensor is generated.

Next, a process of the autonomous vehicle 1 according to this embodiment will be described with reference to FIGS. 4 to 9. FIG. 4 is a flowchart showing a process of the autonomous vehicle 1 according to this embodiment. FIG. 5 is a flowchart showing a three-dimensional shape information imparting process in step S13 shown in FIG. 4. FIG. 6 is a diagram showing a flow of data treated by the autonomous vehicle 1 according to this embodiment. FIG. 7 is a diagram showing an example in which obstacle positions and three-dimensional shapes are linked to each other. FIG. 8 is a diagram showing an example in which three-dimensional shapes of obstacles in the measurement range of the three-dimensional distance sensor are accumulated. FIG. 9 is a diagram showing an example in which a three-dimensional shape of an obstacle outside of the measurement range of the three-dimensional distance sensor is generated. Steps S1 to S5 shown in FIGS. 4 and 5 respectively correspond to steps S1 to S5 shown in FIG. 6. Steps S2 and S3 shown in FIG. 5 respectively correspond to FIG. 7 and FIG. 8, and steps S4 and S5 shown in FIG. 5 correspond to FIG. 9.

First, the process of the autonomous vehicle 1 according to this embodiment will be described with reference to FIGS. 4, 6, and 7.

Assume that the autonomous vehicle 1 starts autonomous traveling (S10). For example, the vehicle 1 starts autonomous traveling to a destination set by a user. However, it is not necessary for the autonomous vehicle 1 to travel to a destination set by a user. The autonomous vehicle 1 may repeat traveling and stopping for any purpose.

The autonomous vehicle 1 acquires information using the three-dimensional distance sensor 2 and the omnidirectional sensor 3 (S11). Specifically, as described above, the three-dimensional distance sensor 2 measures an obstacle within a certain measurement range among obstacles in the vicinity of the autonomous vehicle 1, generates three-dimensional shape information, and outputs the generated three-dimensional shape information to the three-dimensional obstacle position storage unit 11. Further, as described above, the omnidirectional sensor 3 measures obstacles in the vicinity of the autonomous vehicle 1 in all directions, generates obstacle position information, and outputs the generated obstacle position information to the three-dimensional obstacle position storage unit 11. The three-dimensional obstacle position storage unit 11 acquires the three-dimensional shape information output from the three-dimensional distance sensor 2 and the obstacle position information output from the omnidirectional sensor 3.

The autonomous vehicle 1 identifies and tracks obstacles (S12). Specifically, the three-dimensional obstacle position storage unit 11 recognizes the surrounding obstacles and the positions thereof based on the obstacle position information output from the omnidirectional sensor 3, and identifies and tracks the obstacles. The three-dimensional obstacle position storage unit 11 generates identification information and imparts the generated identification information to newly recognized obstacles. The three-dimensional obstacle position storage unit 11 stores the generated identification information and the obstacle position information indicating the positions of the recognized obstacles in the storage unit in such a manner that the identification information and the obstacle position information are linked to each other (S1). The three-dimensional obstacle position storage unit 11 tracks the positions of the obstacles that have already been recognized. Specifically, when the position of the obstacle has been changing, the three-dimensional obstacle position storage unit 11 updates the position indicated by the obstacle position information about the obstacle that is stored in the storage unit to the current position (the position of the obstacle specified based on the obstacle position information output from the omnidirectional sensor 3) (S1).

In the case of tracking the position of an obstacle, a determination as to whether the obstacle specified based on the obstacle position information from the omnidirectional sensor 3 is the same as the obstacle that has already been recognized may be made by any method. For example, in the obstacle position information stored in the storage unit, when a position indicated by a piece of the obstacle position information about a certain obstacle is closest to a position of a certain obstacle specified based on the obstacle position information from the omnidirectional sensor 3, it may be determined that these obstacles are the same.

The autonomous vehicle 1 imparts the three-dimensional shape information about a recognized obstacle to the recognized obstacle (S13). Specifically, the shape to be recognized as the three-dimensional shape of the obstacle by the autonomous vehicle 1 is updated by newly imparting the three-dimensional shape information to newly recognized obstacles and by replacing the three-dimensional shape information about the recognized obstacles with information indicating the newly recognized three-dimensional shape (S3). Thus, as shown in FIG. 7, the identification information, the three-dimensional shape information, and the obstacle position information are stored in the storage unit in such a manner that these pieces of information for each of the identified obstacles are linked to each other. The process in step S13 will be described in detail later with reference to FIG. 5.

The autonomous vehicle 1 plans a path along which the autonomous vehicle 1 travels, calculates drive command values for driving the wheels 5a and 5b to travel along the planned path, and drives the wheels 5a and 5b (S14). Specifically, the path planning unit 12 plans a travel path so that the autonomous vehicle 1 can avoid contacting any obstacle, based on the obstacle position information and the three-dimensional shape information about each obstacle that are stored in the storage unit by the three-dimensional obstacle position storage unit 11. Specifically, for example, information indicating the three-dimensional shape of the autonomous vehicle 1 may be stored in the storage unit in advance, and a path where the three-dimensional shape of the autonomous vehicle 1 does not overlap the three-dimensional shape of each obstacle during traveling of the autonomous vehicle 1 may be derived based on the information.

The vehicle drive control unit 13 calculates drive command values for the actuators 14a and 14b so that the autonomous vehicle 1 travels along the path planned by the path planning unit 12, and drives the actuators 14a and 14b. As a result, the wheels 5a and 5b are driven, thereby allowing the autonomous vehicle 1 to travel along the path planned by the path planning unit 12.

The autonomous vehicle 1 determines whether or not the autonomous vehicle 1 has reached a goal of autonomous traveling (S15). For example, the autonomous vehicle 1 determines that the autonomous vehicle 1 has reached the goal when the autonomous vehicle has reached the above-mentioned destination set by the user.

When it is determined that the autonomous vehicle 1 has reached the goal of autonomous traveling (S15: Yes), the autonomous vehicle 1 ends the autonomous traveling. When it is determined that the autonomous vehicle 1 has not reached the goal of autonomous traveling (S15: No), the autonomous vehicle 1 returns to step S11.

Next, the three-dimensional shape information imparting process of the autonomous vehicle 1 according to this embodiment will be described with reference to FIG. 5 and FIGS. 6 to 9. FIG. 5 is a flowchart for explaining details about step S13 shown in FIG. 6.

The three-dimensional obstacle position storage unit 11 determines whether or not the identified obstacle is within the measurement range of the three-dimensional distance sensor 2 (S20).

When it is determined that the identified obstacle is within the measurement range of the three-dimensional distance sensor 2 (S20: within the range), the three-dimensional obstacle position storage unit 11 acquires the three-dimensional shape of the obstacle from the measurement result of the three-dimensional distance sensor 2, and accumulates the acquired three-dimensional shapes (S21). Specifically, the three-dimensional obstacle position storage unit 11 cuts out three-dimensional shape information within a certain range including the obstacle from the three-dimensional shape information output from the three-dimensional distance sensor 2, and accumulates the cut-out information about the three-dimensional shape accumulated information (S2).

Thus, the three-dimensional shape information is accumulated at constant periods during the time when the obstacle is within the measurement range of the three-dimensional distance sensor 2. Specifically, as shown in FIG. 8, when the measured three-dimensional shapes are accumulated as the three-dimensional shape of the obstacle, the three-dimensional shape newly acquired based on the position of the obstacle is superimposed on the accumulated three-dimensional shapes, thereby updating the three-dimensional shape of the obstacle. In other words, the three-dimensional shape representing a movable range of the obstacle is updated by supplementing the shape newly recognized by the measurement. With this structure, for example, when the obstacle is a moving object, such as a human, the posture variation range of the human (a moving range of an arm or a leg) can be sequentially recorded.

The three-dimensional obstacle position storage unit 11 stores the three-dimensional shape of the obstacle and the obstacle position in such a manner that the three-dimensional shape and the obstacle position are linked to each other based on the measurement result of the three-dimensional distance sensor 2 (S22). Specifically, the three-dimensional obstacle position storage unit 11 stores, in the storage unit, the cut-out three-dimensional shape information as the three-dimensional shape information indicating the latest three-dimensional shape in such a manner that the cut-out three-dimensional shape information is linked to the obstacle position information about the identified object. In this case, as described above, the three-dimensional shape information stored in the storage unit is not limited to the form of cut-out three-dimensional shape information, but may instead be converted into any format. Thus, as shown in FIG. 7, the identification information, the three-dimensional shape information, and the obstacle position information are stored in the storage unit in such a manner that these pieces of information for each of the identified obstacles are linked to each other (S3).

In this case, when the identified obstacle is within the measurement range common to the three-dimensional distance sensor 2 and the omnidirectional sensor 3, the position of the obstacle is tracked while the obstacle position information and the three-dimensional shape information about the obstacle are updated as described above. However, after the obstacle has moved out of the measurement range of the three-dimensional distance sensor 2, the three-dimensional shape of the obstacle cannot be measured and updated, while the position of the obstacle can be tracked.

When it is determined that the identified obstacle is not within the measurement range of the three-dimensional distance sensor 2 (outside of the measurement range) (S20: outside of the range), the three-dimensional obstacle position storage unit 11 calculates a posture variation range of the obstacle (a variation range of the three-dimensional shape of the obstacle) based on the shape recognized as the three-dimensional shape of the obstacle (S23). Specifically, as shown in FIG. 9, the three-dimensional obstacle position storage unit 11 calculates a three-dimensional shape that is obtained by rotating the three-dimensional shapes accumulated for the obstacle about an axis extending vertically upward from the position of the obstacle (S4). In other words, a three-dimensional shape obtained by rotating the accumulated three-dimensional shapes, which are indicated by the three-dimensional shape accumulated information, about the axis of the position of the obstacle. The three-dimensional obstacle position storage unit 11 converts the calculated three-dimensional shape into three-dimensional shape information indicating the three-dimensional shape, and stores, in the storage unit, the information as the three-dimensional shape information indicating the latest three-dimensional shape of the obstacle outside of the measurement range, in such a manner that the three-dimensional shape information and the obstacle position information about the obstacle are linked to each other (S24, S25, S5). This three-dimensional shape information is continuously stored in the storage unit until the obstacle enters the measurement range of the three-dimensional distance sensor 2 again. Further, when the obstacle has entered the measurement range of the three-dimensional distance sensor 2 again, the three-dimensional obstacle position storage unit 11 restores the original three-dimensional shape information. Alternatively, the three-dimensional shape information may be updated by the process in step S22 described above, instead of forcibly restoring the original three-dimensional shape information.

An arbitrary position in the accumulated three-dimensional shape may be determined as a rotation axis of the three-dimensional shape. For example, the center of gravity of the three-dimensional shape may be determined as the rotation axis of the accumulated three-dimensional shapes. In this case, the position of the obstacle and the rotation axis are matched by accumulating the three-dimensional shapes so that the position of the obstacle matches the center of gravity of the accumulated three-dimensional shapes. Alternatively, for example, the center position of a predetermined characteristic portion of the three-dimensional shape may be determined as the rotation axis of the accumulated three-dimensional shapes. When the obstacle is a human, for example, the center position of the head of the human may be determined as the rotation axis. Also in this case, the position of the obstacle and the rotation axis are matched by accumulating the three-dimensional shapes so that the position of the obstacle and the center position of a characteristic portion of the accumulated three-dimensional shapes are matched.

The three-dimensional shape obtained by rotating the accumulated three-dimensional shapes is a three-dimensional shape representing an estimated range within which the obstacle is movable due to a posture variation (for example, a rotational motion) of the obstacle. In the case where the obstacle is a human, for example, the three-dimensional shape of the human whose one arm is raised can be measured by the three-dimensional distance sensor 2; however, if the other arm of the human is raised, or the human turns around 180 degrees while the one arm of the human is raised, after the human has moved out of the measurement range of the three-dimensional distance sensor 2, the autonomous vehicle 1 cannot recognize the projection of the arm as the three-dimensional shape. Accordingly, there is a possibility that the autonomous vehicle 1 will contact the human. Meanwhile, the three-dimensional shape obtained by rotating the three-dimensional shape of the recognized obstacle is recognized as the three-dimensional shape of the obstacle, thereby making it possible to avoid contact with the obstacle even in the above-mentioned case.

Thus, in the case of planning a path for the autonomous vehicle 1 to travel in the direction of the dead zone of the three-dimensional distance sensor 2 (outside of the measurement range), the use of the three-dimensional shape information which is calculated and stored as described above enables an interference determination (contact determination) in view of three-dimensional shapes in path planning, though the interference determination is rough. This enables autonomous traveling with high reliability and high running performance.

In the above embodiment, when the obstacle has moved out of the measurement range of the three-dimensional distance sensor 2, a three-dimensional shape of the obstacle including a posture variation range thereof is estimated and recognized as the three-dimensional shape of the obstacle. However, the latest three-dimensional shape or the accumulated three-dimensional shapes may be directly used, without estimating the three-dimensional shape. Also with this structure, obstacles can be tracked by the omnidirectional sensor 3 and the interference determination can be made in view of the three-dimensional shapes of the obstacles. Accordingly, the three-dimensional shapes of surrounding obstacles can be recognized within a wider range. However, preferably, as described above, the three-dimensional shape of an obstacle including the posture variation range thereof is estimated and recognized as the three-dimensional shape of the obstacle, thereby making it possible to avoid contact with the obstacle even when the obstacle has moved and the three-dimensional shape of the obstacle has been changed.

As described above, in the autonomous vehicle 1 according to this embodiment, when an obstacle (object) is within the measurement range of the three-dimensional distance sensor 2 (three-dimensional measurement device), the control unit 10 updates the shape to be recognized as the three-dimensional shape of the obstacle based on the three-dimensional shape information generated by the three-dimensional distance sensor 2. Further, even after the obstacle has moved out of the measurement range of the three-dimensional distance sensor 2, the control unit 10 tracks the obstacle based on the obstacle position information generated by the omnidirectional sensor 3.

That is, the three-dimensional distance sensor 2 is an inexpensive sensor that cannot measure the three-dimensional shape of each obstacle, but the use of the three-dimensional distance sensor 2 in combination with the omnidirectional sensor 3, which is capable of measuring the positions of obstacles within a wide range, enables recognition of obstacles in the dead zone of the three-dimensional distance sensor 2 which can measure the three-dimensional shape of each obstacle with high accuracy, though the measurement range of the inexpensive three-dimensional distance sensor 2 is narrow. Therefore, according to this embodiment, the three-dimensional shapes of surrounding obstacles can be continuously recognized within a wide range, while preventing an increase in cost.

Figure 10:
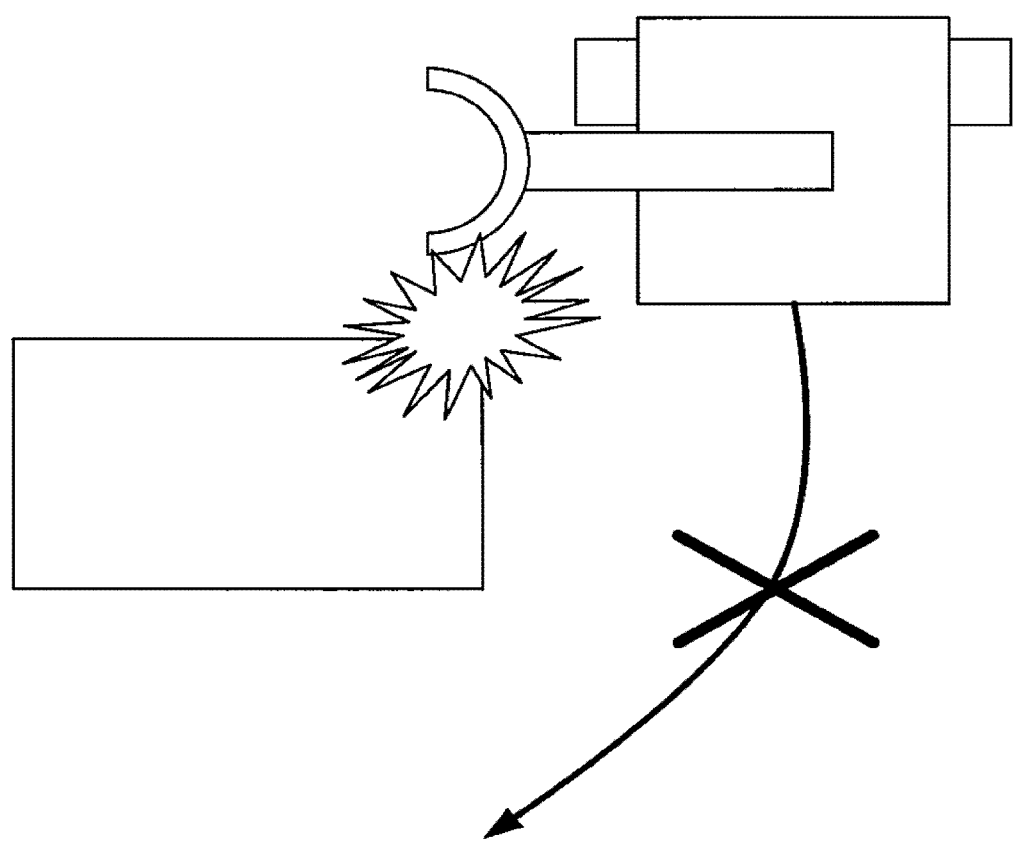
FIG. 10 is a diagram for explaining an advantageous effect of the embodiment.
Figure 11:
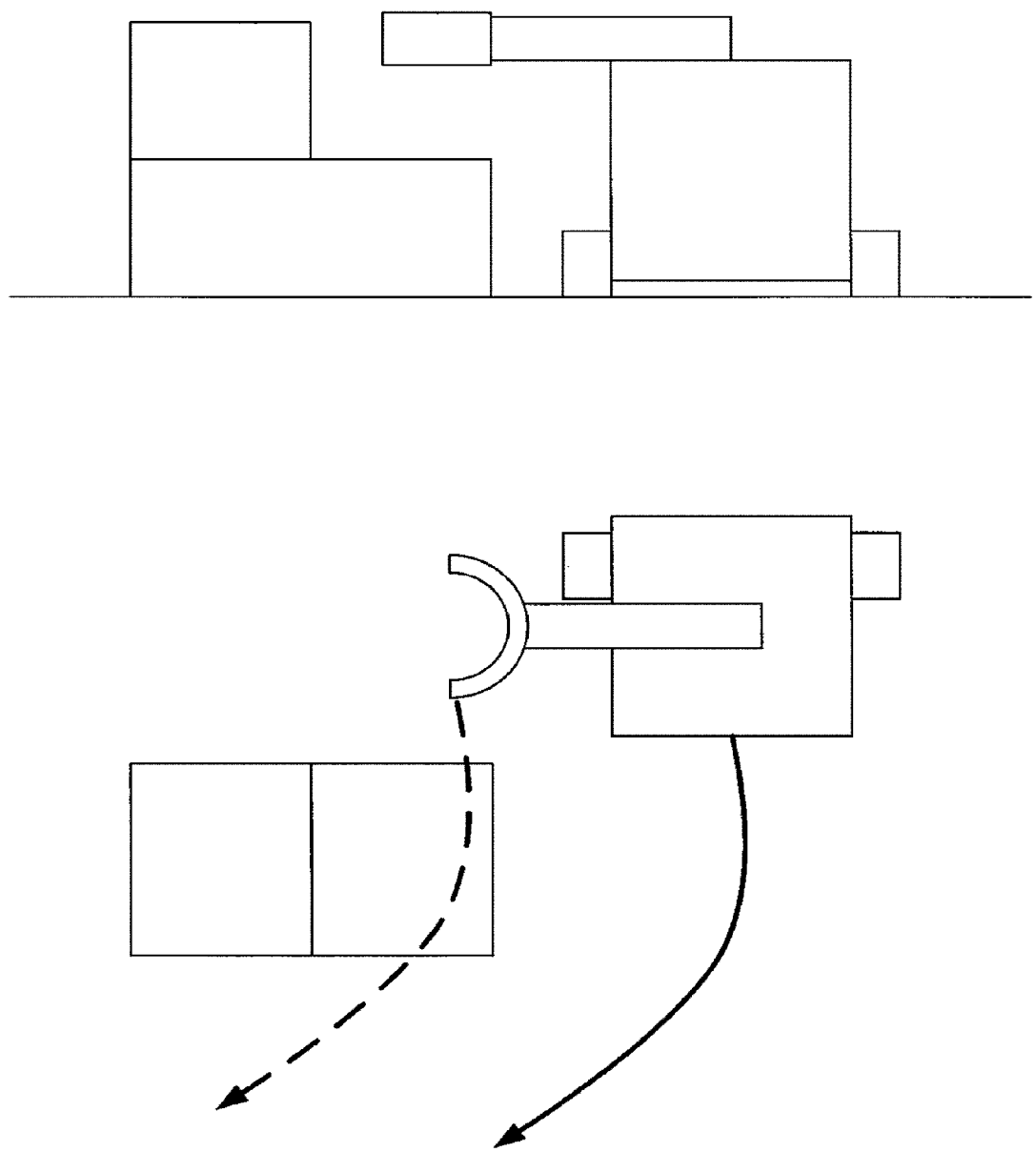
FIG. 11 is a diagram for explaining another advantageous effect of the embodiment.

For example, as shown in FIG. 10, in a case where a travel path is planned to avoid obstacles in consideration of only the presence or absence of obstacles and the positions thereof, without considering the three-dimensional shapes thereof, there is a possibility that the autonomous vehicle will contact an overhanging obstacle or the like, and there is also a possibility that the autonomous vehicle will erroneously determine that it is impossible to travel while avoiding contact with the obstacle though it is actually possible to travel while avoiding contact with the obstacle, with the result that the vehicle will make a large detour around the obstacle. However, according to this embodiment, as shown in FIG. 11, even when the autonomous vehicle 1 travels near an obstacle in the dead zone of the three-dimensional distance sensor 2, the three-dimensional shape of the obstacle is tracked and recognized, so that whether or not the autonomous vehicle 1 can travel while avoiding contact with the obstacle can be determined with high accuracy. For example, even in a case where the autonomous vehicle 1 has a robot arm and the robot arm is projecting, a travel path with high travel efficiency can be planned appropriately, while preventing the robot arm from contacting the obstacle, in consideration of the three-dimensional shape of the obstacle.

Further, in the autonomous vehicle 1 according to this embodiment, the control unit 10 estimates, for each obstacle which has moved out of the measurement range of the three-dimensional distance sensor 2, a three-dimensional shape including a range within which the obstacle is to be changed, based on the shape obtained as the three-dimensional shape of the obstacle, and recognizes the estimated three-dimensional shape as the three-dimensional shape of the object which has moved out of the measurement range of the three-dimensional distance sensor 2.

According to this structure, even when the obstacle is a moving object and the three-dimensional shape of the obstacle is changed, possible three-dimensional shapes of the obstacle can be recognized appropriately. For example, as described above, the three-dimensional shape of each obstacle can be recognized when the three-dimensional shape of the obstacle is changed after the obstacle has moved out of the measurement range of the three-dimensional distance sensor 2. Accordingly, the three-dimensional shape of each obstacle can be suitably recognized by the autonomous vehicle 1 that travels while avoiding obstacles.

Although in this embodiment, the three-dimensional shape representing the posture variation range of the obstacle is estimated by rotating the accumulated three-dimensional shapes, the method of estimating the three-dimensional shapes is not limited to this. For example, the three-dimensional shape representing the posture variation range of the obstacle may be estimated by rotating the latest three-dimensional shape of the obstacle about the position of the obstacle, without performing accumulation of the three-dimensional shapes separately. However, preferably, the three-dimensional shape including the entire posture variation range of the obstacle can be estimated by estimating the three-dimensional shape representing the posture variation range of the obstacle by rotating the accumulated three-dimensional shapes, so that the vehicle can avoid contact with the obstacle.

Other Embodiments of the Invention

In the above embodiment, assuming that the posture variation range of each obstacle is unknown, the three-dimensional shape of each obstacle is updated as needed based on measurement results, and the posture variation range of each obstacle that has moved out of the measurement range common to the two sensors (the three-dimensional distance sensor 2 and the omnidirectional sensor 3) is estimated by rotating the three-dimensional shape of the obstacle, and then the estimated three-dimensional shape is utilized.

However, the identified obstacles may be categorized by analyzing the measurement result of at least one of the two sensors, and the three-dimensional shape of the obstacle within a detailed posture variation range may be specified according to the category of the obstacle.

Specifically, when a characteristic measurement pattern can be obtained from the measurement result (the latest three-dimensional shape or accumulated three-dimensional shapes) of the sensor and the category in which the obstacle is present can be determined, the prepared three-dimensional shape of the posture variation range of the obstacle in the category may be used as the three-dimensional shape of the posture variation range of the obstacle.

For example, when the obstacle is categorized as a human based on the sensor measurement results, the three-dimensional shape information indicating the three-dimensional shape of the posture variation range of the human that is stored in the storage unit in advance may be stored in the storage unit as the three-dimensional shape information indicating the latest three-dimensional shape of the obstacle. More specifically, for various categories, measurement pattern information indicating a measurement pattern included in each obstacle in the categories and three-dimensional shape information about each obstacle in the categories are stored in the storage unit in advance. When a measurement pattern that is identical or similar to the measurement pattern indicated by the measurement pattern information stored in the storage unit is detected in at least one of the measurement results (the obstacle position, the latest three-dimensional shape, and the accumulated three-dimensional shape) of the three-dimensional distance sensor 2 and the omnidirectional sensor 3, the three-dimensional obstacle position storage unit 11 specifies the three-dimensional shape information corresponding to the measurement pattern information as the three-dimensional shape information indicating the three-dimensional shape of the obstacle.

With this structure, the three-dimensional shape of each obstacle can be recognized appropriately. Moreover, a three-dimensional contact determination can be made more accurately in path planning, and thus more reliable autonomous traveling with high running performance can be achieved.

Note that the present invention is not limited to the above embodiments, and can be modified as needed without departing from the scope of the invention.

While in the above embodiments, the latest three-dimensional shape acquired by the three-dimensional distance sensor 2 is recognized as the latest three-dimensional shape of each obstacle, the latest three-dimensional shape is not limited to this. For example, the accumulated three-dimensional shapes may be recognized as the latest three-dimensional shape of each obstacle. However, preferably, the latest three-dimensional shape acquired by the three-dimensional distance sensor 2 is recognized as the latest three-dimensional shape of each obstacle as in the above embodiments. According to this structure, when an obstacle is within the measurement range of the three-dimensional distance sensor 2, path planning can be performed by considering only the three-dimensional shape of the obstacle that is actually visible. Consequently, a travel path with high travel efficiency can be planned, without the autonomous vehicle 1 needing to make an unnecessary detour.

The three-dimensional shape recognition apparatus may include the three-dimensional distance sensor 2, the omnidirectional sensor 3, and the three-dimensional obstacle position storage unit 11 (control unit 10). The three-dimensional shape recognition apparatus is not limited to the autonomous vehicle 1, but can instead also be applied to various devices that perform any control using the three-dimensional shapes of surrounding obstacles (objects) recognized by the three-dimensional shape recognition apparatus.

This application is based upon and claims the benefit of priority from Japanese patent application No. 2013-188267, filed on Sep. 11, 2013, the disclosure of which is incorporated herein in its entirety by reference.

REFERENCE SIGNS LIST

1 AUTONOMOUS VEHICLE
2 THREE-DIMENSIONAL DISTANCE SENSOR
3 OMNIDIRECTIONAL SENSOR
4 MAIN BODY
5a, 5b WHEEL
10 CONTROL UNIT
11 THREE-DIMENSIONAL OBSTACLE POSITION STORAGE UNIT
12 PATH PLANNING UNIT
13 VEHICLE DRIVE CONTROL UNIT
14a, 14b ACTUATOR

The invention claimed is:

1. A three-dimensional object recognition apparatus comprising:
an omnidirectional sensor that measures surrounding objects in all directions, and generates positional information capable of specifying a position of each of the objects as a result of the measurement;
a three-dimensional measurement device that measures an object within a certain measurement range among the surrounding objects, and generates three-dimensional shape information capable of specifying a three-dimensional shape of the object as a result of the measurement; and
a control unit that updates a shape to be recognized as the three-dimensional shape of the object based on the three-dimensional shape information generated by the three-dimensional measurement device when the object is within the measurement range of the three-dimensional measurement device,
wherein the control unit tracks the object based on the positional information generated by the omnidirectional sensor, even after the object has moved out of the measurement range of the three-dimensional measurement device.

2. The three-dimensional object recognition apparatus according to claim 1, wherein
the control unit estimates a three-dimensional shape of an object outside of the measurement range of the three-dimensional measurement device, based on a shape recognized as the three-dimensional shape of the object, the three-dimensional shape including a variation range of the object, and
the control unit recognizes the estimated three-dimensional shape as the three-dimensional shape of the object outside of the measurement range of the three-dimensional measurement device.

3. The three-dimensional object recognition apparatus according to claim 2, wherein the control unit calculates, as a shape including a variation range of the object, a shape obtained by rotating the three-dimensional shape recognized as the shape of the object.

4. The three-dimensional object recognition apparatus according to claim 2, wherein the three-dimensional shape recognized as the shape of the object is a shape obtained by accumulating three-dimensional shapes of the object specified based on the three-dimensional shape information generated by the three-dimensional measurement device.

5. The three-dimensional object recognition apparatus according to claim 1, further comprising a storage unit that stores three-dimensional shape information indicating a shape recognized as a three-dimensional shape of the object and positional information indicating a position of the object, in such a manner that the three-dimensional shape information and the positional information are linked to each other,
wherein the control unit updates the shape to be recognized as the three-dimensional shape of the object by updating the three-dimensional shape indicated by the three-dimensional shape information stored in the storage unit based on the three-dimensional shape information generated by the three-dimensional measurement device, and tracks the object by updating the position of the object indicated by the positional information stored in the storage unit based on the positional information generated by the omnidirectional sensor.

6. A three-dimensional object recognition method comprising the steps of:
measuring, by a three-dimensional measurement device, a three-dimensional shape of an object within a certain measurement range of the three-dimensional measurement device among surrounding objects, and updating a shape to be recognized as the three-dimensional shape of the object within the measurement range of the three-dimensional measurement device based on a result of the measurement; and measuring, by an omnidirectional sensor, positions of the surrounding objects in all directions, and tracking, based on a result of the measurement, an object that has moved out of the measurement range of the three-dimensional measurement device.

7. A vehicle comprising:

an omnidirectional sensor that measures surrounding objects in all directions, and generates positional information capable of specifying a position of each of the objects as a result of the measurement;

a three-dimensional measurement device that measures an object within a certain measurement range among the surrounding objects, and generates three-dimensional shape information capable of specifying a three-dimensional shape of the object as a result of the measurement; and a control unit that updates a shape to be recognized as the three-dimensional shape of the object based on the three-dimensional shape information generated by the three-dimensional measurement device when the object is within the measurement range of the three-dimensional measurement device, plans a travel path to avoid contact with the obstacle, based on the recognized three-dimensional shape of the object, and controls the vehicle to travel along the planned travel path, wherein the control unit tracks the object based on the positional information generated by the omnidirectional sensor, even after the object has moved out of the measurement range of the three-dimensional measurement device.

8. The three-dimensional object recognition apparatus according to claim 3, wherein the three-dimensional shape recognized as the shape of the object is a shape obtained by accumulating three-dimensional shapes of the object specified based on the three-dimensional shape information generated by the three-dimensional measurement device.

9. The three-dimensional object recognition apparatus according to claim 2, further comprising a storage unit that stores three-dimensional shape information indicating a shape recognized as a three-dimensional shape of the object and positional information indicating a position of the object, in such a manner that the three-dimensional shape information and the positional information are linked to each other, wherein the control unit updates the shape to be recognized as the three-dimensional shape of the object by updating the three-dimensional shape indicated by the three-dimensional shape information stored in the storage unit based on the three-dimensional shape information generated by the three-dimensional measurement device, and tracks the object by updating the position of the object indicated by the positional information stored in the storage unit based on the positional information generated by the omnidirectional sensor.

10. The three-dimensional object recognition apparatus according to claim 3, further comprising a storage unit that stores three-dimensional shape information indicating a shape recognized as a three-dimensional shape of the object and positional information indicating a position of the object, in such a manner that the three-dimensional shape information and the positional information are linked to each other, wherein the control unit updates the shape to be recognized as the three-dimensional shape of the object by updating the three-dimensional shape indicated by the three-dimensional shape information stored in the storage unit based on the three-dimensional shape information generated by the three-dimensional measurement device, and tracks the object by updating the position of the object indicated by the positional information stored in the storage unit based on the positional information generated by the omnidirectional sensor.

11. The three-dimensional object recognition apparatus according to claim 4, further comprising a storage unit that stores three-dimensional shape information indicating a shape recognized as a three-dimensional shape of the object and positional information indicating a position of the object, in such a manner that the three-dimensional shape information and the positional information are linked to each other, wherein the control unit updates the shape to be recognized as the three-dimensional shape of the object by updating the three-dimensional shape indicated by the three-dimensional shape information stored in the storage unit based on the three-dimensional shape information generated by the three-dimensional measurement device, and tracks the object by updating the position of the object indicated by the positional information stored in the storage unit based on the positional information generated by the omnidirectional sensor.

* * * * *